No. 832,373. PATENTED OCT. 2, 1906.
W. A. GIBSON.
FEED WATER HEATER AND PURIFIER.
APPLICATION FILED JUNE 12, 1903. RENEWED FEB. 25, 1905.
2 SHEETS—SHEET 1.
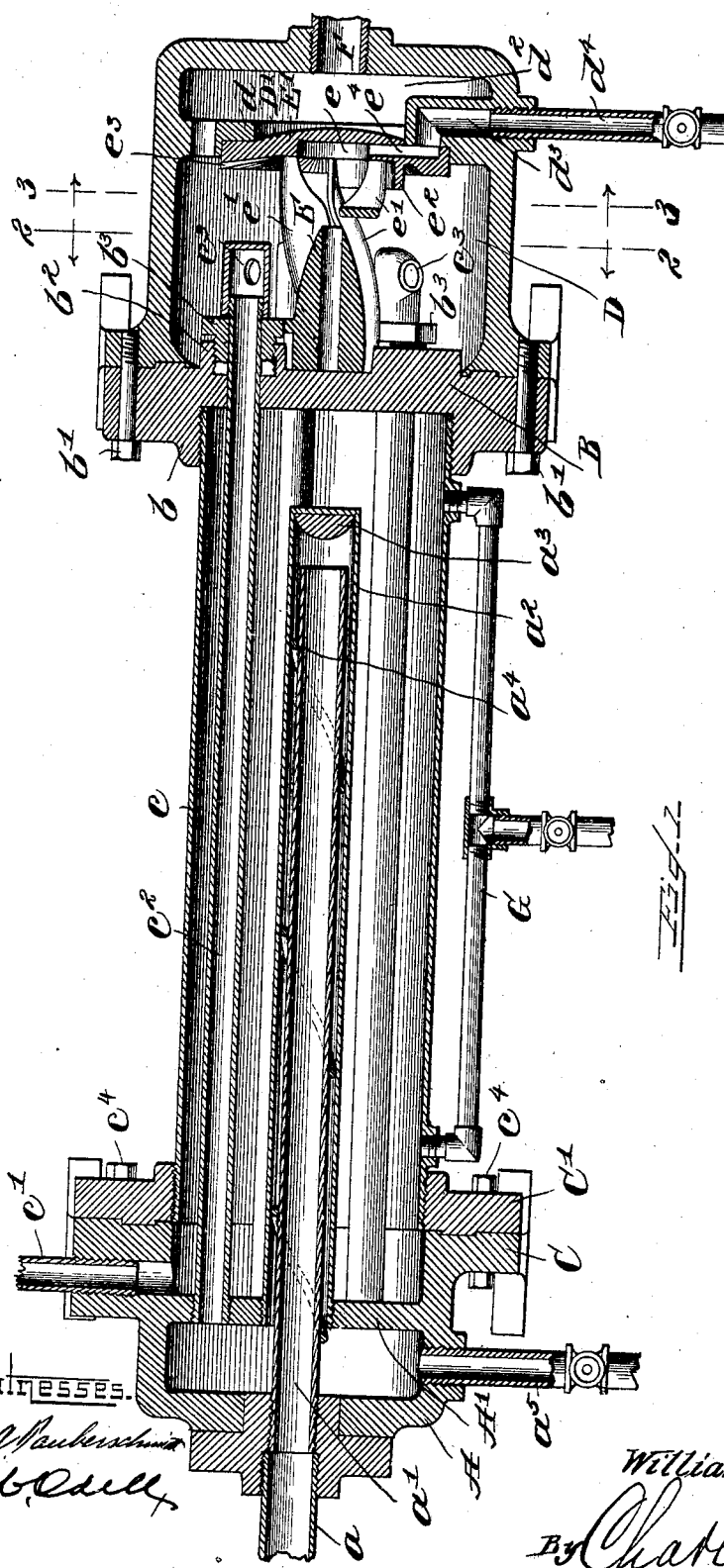

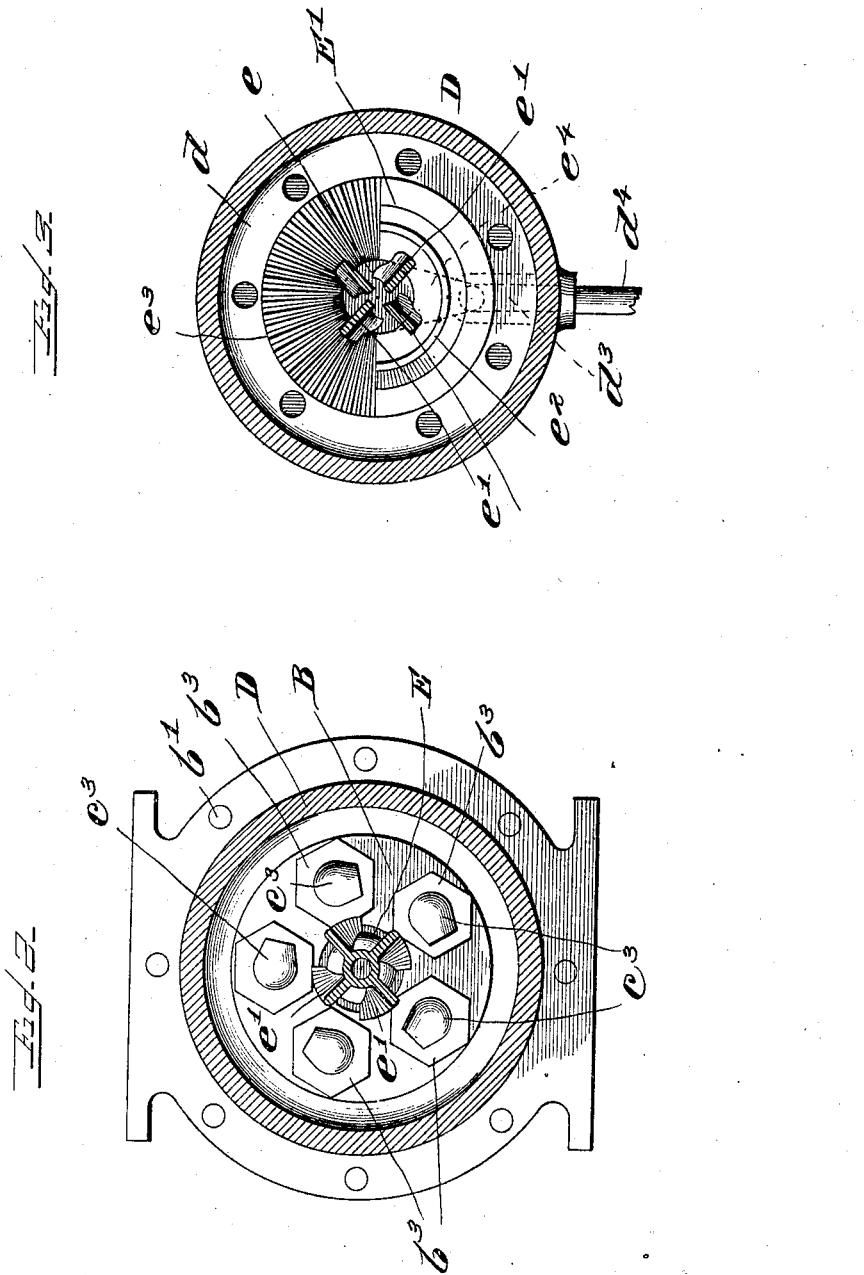

UNITED STATES PATENT OFFICE.

WILLIAM ASA GIBSON, OF MUSCATINE, IOWA, ASSIGNOR TO AMERICAN GIBSON HEATER COMPANY, A CORPORATION OF ARIZONA TERRITORY.

FEED-WATER HEATER AND PURIFIER.

No. 832,373.   Specification of Letters Patent.   Patented Oct. 2, 1906.

Application filed June 12, 1903. Renewed February 25, 1905. Serial No. 247,250.

*To all whom it may concern:*

Be it known that I, WILLIAM ASA GIBSON, a citizen of the United States, and a resident of the city of Muscatine, county of Muscatine, and State of Iowa, have invented certain new and useful Improvements in Feed-Water Heaters, Separators, and Purifiers for Boilers or the Like; and I do hereby declare that the following is a full, clear, and exact description of the same, reference being had to the accompanying drawings, and to the letters of reference marked thereon, which form a part of this specification.

This invention relates more particularly to a feed-water heater, purifier, and separator designed to raise the feed-water for boilers or the like to approximately the same temperature as the water in the boiler and separate all impurities therefrom before admission thereinto.

The invention is an improvement over my prior invention—feed-water heater and purifier—issued to the Gibson Heater Company, of Muscatine, Iowa, on the 9th day of December, 1902, and numbered 715,656.

Much difficulty in all localities has been experienced heretofore in securing feed-water for boilers of requisite purity to prevent rapid scale formation. Such scale formation when it occurs not only seriously menaces the life of the boiler itself, but greatly decreases the steaming power thereof owing to the absorption of heat by the interior lining of scale and endangers the boiler, inasmuch as impacted scale permits the plates to become burned. A few mechanical devices have been contrived for the purpose of purifying the water from the scale-forming sediments or materials therein; but in most instances chemical solutions are inserted into the boiler for the purpose of precipitating the scale-forming material before the same can deposit upon the tubes and flues of the boiler. Inasmuch, however, as the matter contained in solution in the water varies from time to time owing to surface drainage and in locomotive-boilers owing to the fact that water is obtained from different and widely-separated sources or wells the chemicals cannot be relied upon, as the chemicals acting to precipitate certain scale-forming materials fail to act at all on others and in some instances attack the boiler itself, frequently proving a source of serious expense and danger. Imperfect purification in the feed-water heater also results in foaming, which seriously endangers the boiler and frequently the engine as well, as a sufficient amount of water is sometimes carried over to the cylinders to wreck the engine.

The object of this invention is to provide a mechanical device having no moving parts whatever and acting to receive the water therein from any source of supply and to deliver the same into the boiler at a high temperature and with all deleterious or scale-forming ingredients removed therefrom, and not only acting to prevent the formation of scale by excluding the scale-forming material, but actually cleansing a congested boiler from scale previously deposited, inasmuch as water admitted being free from impurities and at a very high temperature is in a condition to act as a solvent upon the scales already deposited.

The invention consists in the matters hereinafter described and more fully pointed out, and defined in the appended claims.

In the drawings, Figure 1 is a longitudinal vertical section of a device embodying my invention. Fig. 2 is a section taken on line 2 2 of Fig. 1. Fig. 3 is a section taken on line 3 3 of Fig. 1.

In said drawings, A indicates a chambered head into which a pipe $a$, leading from the boiler pump or injector of any desired type, opens axially and is in open communication and axial alinement with an inwardly-directed nozzle $a'$ of less diameter. Said nozzle $a'$ is open at its inner end and extends through an inner wall $A'$ in the head A to near an inner head B. Concentric with the nozzle $a'$ is the pipe $a^2$, inclosing the same and having a closed inner end, as shown in Fig. 1, and provided therein with a rounded or convex baffle-plate $a^3$ in advance of the open end of the pipe $a'$ and acting to spray the jet of water admitted through said nozzle radially therefrom against the sides of the pipe $a^2$. Secured on the outer side of the nozzle $a'$ is a rib $a^4$, which extends spirally around the same approximately from its delivery end to the inner wall $A'$, so that the water sprayed from said baffle-plate is forced through the restricted annular passage between the nozzle $a'$ and the pipe $a^2$ with a rapid rotary motion and discharged into the inner chamber of the head A with great force and in rapid rotation.

Integral with the head A is the forwardly-directed integral flange C, ground on its inner face to afford a joint and against which is rigidly bolted the collar C', ground complementary therewith, which engages the casing tube or shell $c$, which at its other end is threaded into a forwardly-directed flange $b$ of the head B. Said casing incloses the pipes already described and forms a steam-chamber into which live or exhaust steam, as preferred, is admitted through the pipe $c'$, which opens through the flange C and which, if live steam is used, communicates at its other end with the steam-dome of the boiler. The outer face of the head B is ground to provide a joint, and the casing D of cast metal or other suitable material and complementally ground is rigidly secured thereto by the bolts $b'$. Said casing D is divided vertically by the integral partition $d$ into an inner chamber $d'$, containing a centripetal separating device and a smaller chamber $d^2$, from whence the superheated and purified water flows to the boiler through a discharge-pipe F.

Arranged around the nozzle and pipe $a'$ $a^2$ within the shell or casing $c$ and parallel therewith are the pipes $c^2$, which at one end are threaded into and open through the partition A' and at the other end extend through the head B into the centripetal separating-chamber $d'$ of the casing D and are each provided therein with a nozzle $c^3$, directed at an angle therewith and obliquely against the inner periphery of the casing. As shown, internally-screw-threaded bosses $b^2$ are provided in the separating-chamber $d'$ on the head B, and through which said pipes $c^2$ extend, and a follower-nut $b^3$ is provided on each pipe $c^2$ and have screw-threaded engagement in said bosses, thereby forming glands. Opening through the partition $d$ in the casing D and near the periphery of said partition are a plurality of apertures, as shown in Fig. 3, through which the chambers $d'$ $d^2$ communicate. A concave disk E' is seated in a central depression or seat in the inner face of the partition $d$ and is provided with a central cavity $e$, communicating with a passage $e^4$, extending downwardly therethrough and opening into a passage $d^3$, leading downwardly through the partition $d$ and communicating with a waste-pipe $d^4$.

A spiral deflector E is seated at one end in a central recess in the head B and bears at its other end against the disk E' and comprises a central conical core, the base of which rests against said head B and the apex of which is directed toward the central aperture in the disk E', as shown in Fig. 1, and extends to a point intermediate between the head B and said disk. A plurality of spiral blades $e'$, as shown four in number, are secured on said core with the edges thereof turned at an angle with the direction of the current of the water in the chamber $d'$ and at their ends bear against the disk E'. Said blades are cut away centrally adjacent to said disk, providing passages therethrough leading into the cavity $e$, as shown in Figs. 1 and 3. Integral with the disk E' and below said spiral separator is provided an inwardly-projecting flange $e^2$, extending in a semicircle beneath the separator. Above the separator and commencing with the ends of the flange $e^2$ a plurality of radial or slightly-oblique ribs $e^3$ are provided, against which the lighter precipitate in the water impinges, and is thereby conducted to the waste-pipe. A valved pipe G is connected in the bottom of the casing $c$, whereby the water of condensation is permitted to escape from the heater.

The operation is as follows: The water from the pump or injector admitted through the pipe $a$ is constricted in the nozzle $a'$ and sent with great force against the baffle-plate $a^3$ and being intensely heated by the superheated steam in the casing surrounding the same and pipe $a^2$ is quickly raised to a temperature approximately that of the steam in said casing and is directed backwardly through the annular spiral passage, as before described, into the chamber or mud-drum in the head A. The water thus forced along said passage is heated by contact with the baffle-plate and the tube $a^2$ to a sufficient temperature to precipitate the most of the sediment and scale-forming materials contained in solution therein in a condition not readily again dissolved by the water, and by the innumerable currents set up in said passage every particle of sedimentary matter is alternately heated and cooled in its passage along the nozzle $a$ until precipitation is complete, and the water is delivered into the chamber in the head A. Here, inasmuch as the inlet-passage from the pipe $a^2$ is considerably restricted and the outlet-passages through the pipes $c^2$ are materially larger, the water by its rotation in said chamber around the cold nozzle $a'$ is cooled and tends to separate the sediment and precipitated matter centrifugally, as the precipitates heavier than the water are thrown to the outside and a large portion thereof is left behind, settling to the bottom of the chamber and escaping through the waste-pipe $a^5$, which of course is provided with any desired form of valve to regulate the discharge therefrom. The water thus relieved of a large portion of its heavier impurities is conducted and reheated under considerable pressure through the head B into the chamber $d'$ of the casing D and here is directed through the laterally-turned nozzle $c^3$ against the side walls of the chamber, whirling rapidly around the same with great force and filling said chamber except at the center. Owing to the rapidity of the rotation the remaining solids in suspension, which are lighter than the water, are forced to the center, where impinging against the spiral blades $e'$, directed obliquely against the current, said solids are directed thereby and by the ribs $e^3$ and flange $e^2$ into the central cavity in the disk E', from whence the separated material flows outwardly through the passage $d^3$ and waste-pipe $d^4$. The purified water superheated during its passage through the pipe $c^2$ escapes into the chamber $d^2$ through the apertures near the periphery of the partition $d$ and from thence passes through the pipe F into the boiler at about the temperature of the water therein. Obviously inasmuch as the waste-pipe $a^5$ is situated at the periphery of the chamber in the head A the rotating mass of water therein is deprived of its heavier sediments and impurities, owing to the same being thrown outwardly or centrifugally by the rotation, while the water with the lighter solids in solution, but freed of its heavier solids, passes into the chamber $d'$, and inasmuch as the separator in said chamber is located centrally the water heavier than the remaining solids suspended therein is thrown to the periphery of the casing and the solids in suspension therein being of less specific gravity and forced toward the center and engage the blades $e'$ and are eliminated centripetally, as before described. The water is thus admitted into the boiler very hot and in such a state of purity that it slowly loosens the scale from the interior of the boiler, permitting it to fall therefrom into position to be blown off or washed out in the usual manner, and experience and practical tests have not only shown the sufficiency of the device in heating and purifying feed-water, but as well in cleaning congested boilers of accumulated scale.

I have described but one of many ways in which my invention may be embodied, and it is obvious that the form, shape, and size of the construction may vary and heat may be applied thereto in other ways than herein described, and it is also obvious that the same may be used in connection with any type of boiler and for any desired purpose or position, and I do not desire to be limited to the specific details of construction herein described, inasmuch as many details of construction may be varied without departing from the principle of this invention.

I claim as my invention—

1. In a heater and purifier the combination with an inlet-pipe and means for forcing the fluid to be heated therethrough, of a restricted nozzle continuous with the inlet-pipe, a baffle-plate opposite the end of the nozzle, means for heating the baffle-plate to a high temperature, a separating-chamber, an annular spiral passage concentric with said nozzle and having one hot and one cold wall and leading from said baffle-plate into the separating-chamber and delivering the heated water thereinto under rapid gyratory motion, a discharge-pipe in the bottom of the separating-chamber through which the heavier solids in suspension escape, superheating-pipes through which the water flows from the separating-chamber and a plurality of curved blades adjacent the discharge end of said pipes.

2. In a feed-water heater and purifier the combination with an inlet-pipe of a restricted nozzle thereon, means for spraying and heating to a high temperature the water admitted therethrough, a spiral, restricted passage through which the heated water is passed between an inner cold wall and an outer hot wall, a centrifugal separating-chamber into which said water is delivered with rotary motion, a waste-pipe connected peripherally in the wall of the chamber and from which the heavier solids in suspension escape, a centripetal separating-chamber, superheating-pipes leading from the centrifugal chamber, into the centripetal separating-chamber, means for directing the water therefrom obliquely against the walls of said chamber, and means located centrally of said chamber acting to divert the lighter solids in suspension into a discharge-passage.

3. A water heater and purifier provided with means for admitting cold water under pressure thereinto, and first spraying and highly heating the same, then partly cooling and delivering the same with rotary motion into a centrifugal separating-chamber provided with means permitting the separation of the heavier solids in suspension therefrom, means for again highly heating the water, a centripetally-operating separating-chamber into which the heated water is delivered with a gyratory movement, a deflector located centrally of said chamber and acting to remove the lighter solids in suspension, said chamber having peripherally-disposed apertures through which the heated and purified water escapes to the boiler under pressure.

4. The combination in a water heater and purifier of means for removing the heavier solids therefrom, a separating-chamber, means for superheating the water thereafter and delivering the same with great force obliquely against the sides of said separating-chamber, a spiral deflector located axially of said chamber and having its edges presented to the whirling mass of water and acting to direct the lighter impurities therefrom into a passage opening axially from said chamber, said separating-chamber having peripherally-disposed exit-passages leading to the boiler-feed pipe.

5. The combination in a boiler-feed heater and purifier of means for highly heating the water and directing the same alternately against a hot and a cold surface, precipitating the solids in suspension thereby, a separating-chamber into which the water is delivered under high rotary motion, a blow-off pipe leading therefrom and from whence the heavier solids are delivered, an auxiliary centripetally-operating separating-chamber and a pipe leading therefrom to the boiler or the like, superheating-pipes from whence the water is conducted into said auxiliary separating-chamber.

6. The combination with means acting to precipitate the solids from feed-water of a centripetally-operating separating-chamber connected therewith and into which the water is delivered therefrom, spirally-curved blades located centrally therein and acting to separate from said water the solids in suspension and to deliver the same from the heater, and a passage communicating with said chamber and the boiler.

7. The combination in a water heater and purifier, of means acting to precipitate the solids therein, a mud-drum in which a part of the solids are separated and removed, superheating pipes leading therefrom, a separating-chamber into which said pipes open obliquely and a deflector located therein acting to remove the remaining solids therefrom.

8. The combination with a water heater and purifier acting to precipitate the solids contained in solution in the water and to remove the heavier solids therefrom, of a separating-chamber, superheating-pipes acting to deliver the partly-purified water obliquely into said separating-chamber under pressure and producing a centrifugally-flowing current of high velocity, a rigid deflector in said chamber acting to draw the impurities inwardly to a centrally-located exit-passage, and an outlet-pipe leading to the boiler or the like.

9. The combination with a water heater and separator of reheater-pipes leading therefrom, a separator-chamber into which said pipes open obliquely and outwardly acting to produce rotary motion in the water therein, of a deflector located axially of said chamber and having its edges directed against the current on the inner side and acting to engage the precipitated solids in the current and direct the same to an exit-aperture at the axis of said chamber and discharge-passages near the periphery of the chamber communicating with the boiler or the like.

10. The combination with a water heater and purifier acting to highly heat the water and precipitate the solids therein and to eliminate the heavier solids centrifugally, of a separating-chamber, superheating-pipes acting to deliver the heated and partly-purified water thereinto, axially-disposed separating means in said chamber acting to draw the remaining solids inwardly to a point of discharge located axially of the chamber, and a pipe communicating with said chamber and the boiler or the like.

11. In a device of the class described a separating-chamber comprising a cylindrical shell, inlet-passages opening thereinto and directly obliquely against the side wall thereof, a spiral deflector in said chamber, a deflecting-plate at the end of the chamber having a central exit-aperture therein and registering with the end of said deflector and a delivery-pipe opening from said chamber.

12. In a device of the class described the combination with a centrifugal separating-chamber, of means for delivering water thereinto with a gyratory motion, a centripetal separating-chamber, superheating-pipes connecting said chambers, a steam-chest inclosing said pipes, a laterally-directed nozzle on said pipes, within the centripetal chamber, a deflector in said chamber and means for carrying off the separated solids.

13. The combination in a water heater and purifier of a centrifugal separating-chamber, means for delivering water thereinto with a gyratory motion, a centripetal separating-chamber, a plurality of superheating-pipes connecting said chambers and extending into the centripetal chamber, a laterally-directed nozzle on each pipe, an axially-disposed spiral deflector in said centripetal chamber, a radially-ribbed disk and means thereon for collecting and discharging the separated solids.

14. The combination in a water heater and purifier, of a centrifugal separating-chamber, a casing having an outer chamber therein and an inner centripetal separating-chamber, a plurality of superheating-pipes connecting said centrifugal chamber with said centripetal separating-chamber, means for separating and forcing solid matter from the water to the center of said chamber through a discharge-exit and forcing the purified water to the outer side of said chamber and into said outer chamber.

In testimony whereof I have hereunto subscribed my name in the presence of two subscribing witnesses.

WILLIAM ASA GIBSON.

Witnesses:
JAMES N. YOUNG,
C. W. HILLS.